United States Patent [19]
Aebischer et al.

[11] Patent Number: 5,627,454
[45] Date of Patent: May 6, 1997

[54] METHOD FOR STABILIZING A POWER SUPPLY NETWORK AGAINST REACTIVE LOAD FLUCTUATIONS, AND A POWER FACTOR COMPENSATION DEVICE

[75] Inventors: Hanspeter Aebischer, Büttikon; Roger Mathys, Ennetbürgen, both of Switzerland

[73] Assignee: ABB Management AG, Baden, Switzerland

[21] Appl. No.: 284,109

[22] Filed: Aug. 2, 1994

[30] Foreign Application Priority Data

Aug. 19, 1993 [DE] Germany ............... 43 27 894.9

[51] Int. Cl.⁶ ........................................... G05F 1/70
[52] U.S. Cl. ........................ 323/210; 323/218; 373/105
[58] Field of Search ......................... 323/205, 210, 323/218; 373/105, 108

[56] References Cited

U.S. PATENT DOCUMENTS

| | | |
|---|---|---|
| 5,351,267 | 9/1994 | Strebel .................... 373/105 |
| 5,438,588 | 8/1995 | Wanner .................... 373/108 |

FOREIGN PATENT DOCUMENTS

| | | |
|---|---|---|
| 0498239A1 | 8/1992 | European Pat. Off. . |
| 3708468A1 | 9/1987 | Germany . |
| 3915213C2 | 2/1992 | Germany . |

*Primary Examiner*—Peter S. Wong
*Assistant Examiner*—Shawn Riley
*Attorney, Agent, or Firm*—Burns, Doane, Swecker & Mathis, L.L.P.

[57] ABSTRACT

During operation, DC arc furnaces (8) produce undesired reactive load fluctuations which are compensated by means of a power factor compensator (31). An AC power controller (28) of the power factor compensator (31) is controlled as a function of a stabilization striking angle signal ($\alpha_{st}$) which is controlled in accordance with the reactive power of filter branches (4, 4') by a function generator (26) as a function of a desired reactive power signal ($Q_{des8}$), of a reactive power actual value signal ($Q_8$) of the arc furnace (8) and of a filter reactive power signal ($Q_F$). The desired reactive power signal ($Q_{des8}$) is formed by means of a phase-angle controller (35) as a function of a total current intensity ($i_{33}$) which, in addition to the current actual value ($i_{act}$) of the arc furnace (8) also comprises the current of the filter branches (4, 4') and that of any auxiliaries.

9 Claims, 2 Drawing Sheets

METHOD FOR STABILIZING A POWER SUPPLY NETWORK AGAINST REACTIVE LOAD FLUCTUATIONS, AND A POWER FACTOR COMPENSATION DEVICE

TECHNICAL FIELD

The invention proceeds from a method for stabilizing a power supply device or a power supply network against reactive load fluctuations of at least one electric device or installation of variable reactive load, and from a power factor compensation device.

PRIOR ART

U.S. Pat. No. 5,155,740 discloses a flicker compensation device for DC arc furnaces, in which reactive power control is performed only as a function of the detected reactive power of the arc furnace.

In the case of this compensation, no account is taken of currents in filter branches and auxiliary equipments. In the case of small electrode currents, the reactive power of the furnace can become too low. When there are permanently installed capacitor banks, this leads to overcompensation, which is frequently not accepted by power supply companies.

The printed publication No. CH-IT 123 090 D entitled Kompensationsanlagen für die Industrie (Industrial Compensation Installations) from the Swiss company of BBC Aktiengesellschaft Brown, Boveri & Cie. (now: Asea Brown Boveri AG), CH-5401 Baden/Switzerland, December 1983, pages 1 to 12 discloses the control, individually for each phase, of reactive load changes occurring during operation of arc furnaces by means of a 3-phase reactive element composed of 3 air-core inductors via thyristor AC controllers. The control is performed as a function of the supply voltage, the actual current value of the arc furnace and of the compensation installation, as well as of the desired value of the current through the reactive element. Connected in parallel with this reactive element are capacitors which act with their series inductors and, as the case may be, damping resistors as a reactive power source and simultaneously as a filter to suppress harmonic currents of different orders. The variable reactive load of the reactive element, and those of the consumers add together in this case in such a way that the sum of the two reactive loads is constant and, together with the constant capacitive reactive power of the fixed capacitor groups, yields a desired value of cos f.

A relatively long mean dead time of 5 ms is yielded for the system by measuring and analyzing the controlled variables.

EP-A1-0 498 239 discloses controlling an arc furnace by means of DC feed, having 2 control loops. A current controller ensures a constant current corresponding to a prescribed desired current value. An electrode control loop influences the position of the electrode, and thus the arc length. In the event of lengthening of the arc, the current controller must increase the voltage or drive the rectifier in such a way that the current remains constant. However, this is only possible as long as there is a voltage reserve. Controlling the electrode is performed by means of an adaptable DC voltage controller. The arc voltage, which is fed via a damping element to a comparator or summer, serves as the actual DC voltage value. The desired DC voltage value must be calculated in each case taking account of the transformer voltage stage and of the electrode current for each working point. Firstly, a limiter is used to limit in accordance with the transformer stage of the converter transformer, and thus with the possible voltage range of the power converter in such a way that the power converter is operated in a steady-state fashion at most just below the rectifier limit. The desired value is fed in a smooth fashion to the summer, in order in the event of sudden changes in the desired voltage values not to obtain any overshooting of the actual value, which could effect interrupting of the arc. Nothing is stated there about compensating reactive power fluctuations.

SUMMARY OF THE INVENTION

The invention achieves the object of further developing a method and a power factor compensation device for stabilizing a power supply device or a power supply network against reactive load fluctuations of at least one electric device or installation of variable reactive load of the type mentioned at the beginning in such a way that reactive load fluctuations are more effectively compensated.

An advantage of the invention is that the reactive powers of all the loads which are connected to the compensating installation are relatively quickly compensated by detecting the total current for the purpose of compensating the reactive load fluctuations. The result is a constant inductive reactive power for the entire installation, which can be compensated by means of permanently installed or connected capacitor banks or by means of harmonic filters. Installations of variable reactive load can also be connected to very weak power supply networks by means of this compensation of the reactive load fluctuations. It is thus possible to connect installations of over 50 MW to power supply networks whose short-circuit power is at least equal to 10 times the installation power.

BRIEF DESCRIPTION OF THE DRAWINGS

The invention is explained below with the aid of an exemplary embodiment.

DETAILED DESCRIPTION OF PREFERRED EMBODIMENTS

Figure 1:
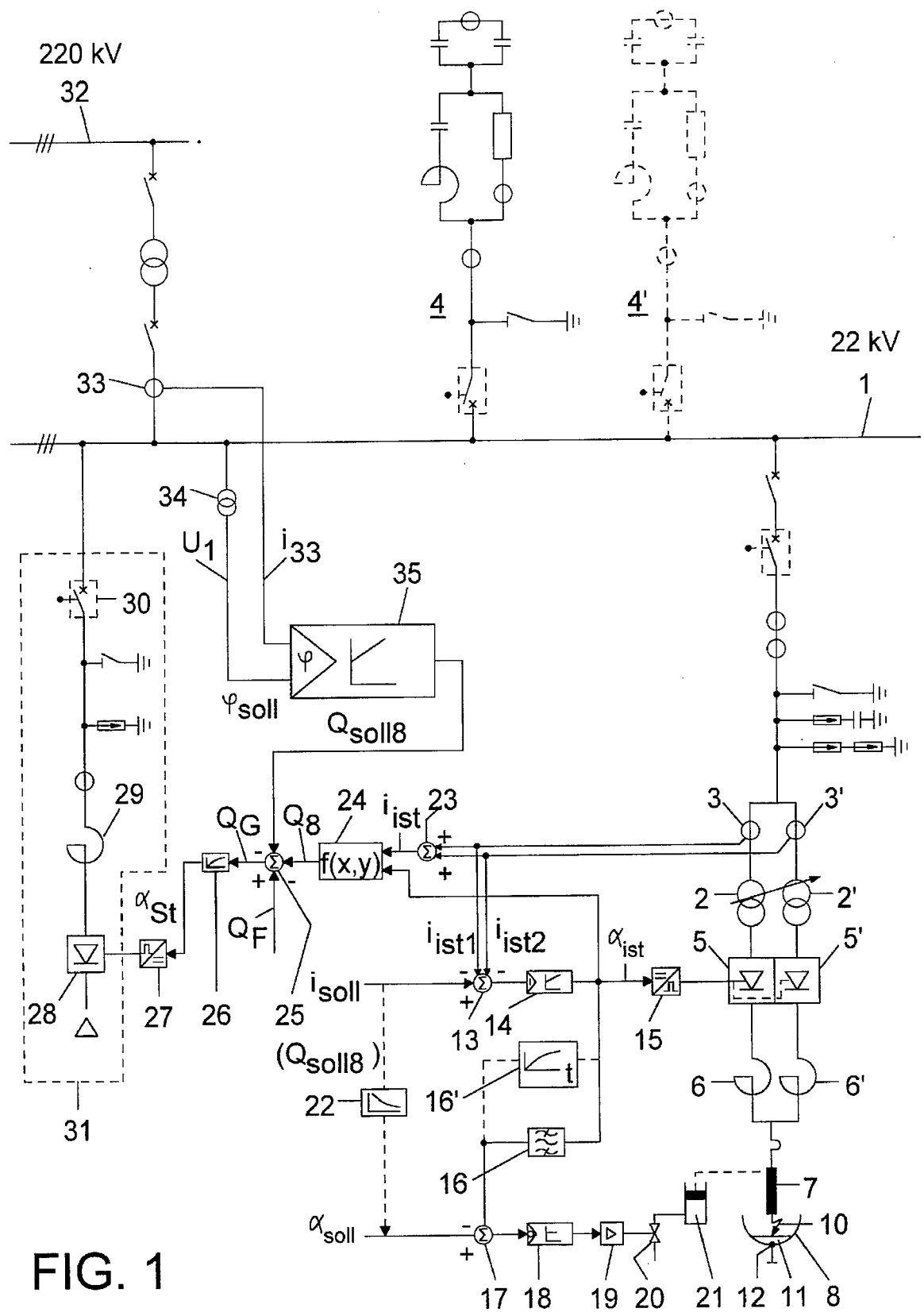
FIG. 1 shows a DC arc furnace having a current control loop, an electrode control loop and a reactive power control loop.

FIG. 1 shows an arc furnace (8) having an electrode or cathode (7), which is connected to an AC power supply network (1) having an AC voltage of 22 kV via 2 reactive elements or inductors (6, 6'), which are connected in series, in parallel branches respectively to a rectifier (5, 5'), a furnace transformer (2, 2') having a plurality of switching stages, and to a current transformer (3, 3'). A 2nd electrode or anode (12) arranged in the bottom region of the arc furnace (8) is connected to the positive terminal of the rectifier (5) (not represented). An arc (10) burns between the lower end of the cathode (7) and a material or scrap to be melted (not represented) as well as with the surface of a melt or of a molten bath (11).

Partial current actual value signals ($i_{act1}$, $i_{act2}$) are detected by means of the current transformers (3, 3') in the AC supply leads to the rectifiers (5, 5') and fed to non-negating inputs of a summer (23) as well as to two negating inputs of a comparator or summer (13). A prescribable current desired value signal ($i_{des}$) is fed, for example from a potentiometer (not represented), to a non-negating input of this summer (13). On the output side, the summer (13) is connected to a current controller (14) having a proportional-integral characteristic, which on the output side supplies a rectifier manipulated variable signal ($\alpha_{act}$) in a fashion corresponding to a striking angle to an ignition pulse transformer (15) which controls the rectifiers (5, 5') on the output side.

For the purpose of signal matching, limit value monitoring and suppressing undesired frequencies, the rectifier manipulated variable signal ($\alpha_{act}$) is connected via a damping element (16') or a bandpass filter (16) to a negating input of a summer (17) whose non-negating input is fed a prescribable electrode controller reference variable signal ($\alpha_{des}$) in accordance with a striking angle desired value in the range of 15°–50°, preferably in the range of 25°–35°. On the output side, the summer (17) is connected to an electrode controller (18) which has a proportional characteristic and acts on the output side via a amplifier (19) on a switch (e.g., valve such as a thyristor, transistor or the like) (20) of an electrode adjusting device (21). The electrode adjusting device (21), for example a hydraulic pump having an adjusting mechanism and an electrode speed controller, is mechanically coupled to the cathode (7) and permits the level thereof to be adjusted; it acts as a 1st order delay element.

The electrode control works approximately 10 times slower than the current control. The level adjustment of the cathode (7) is performed in such a way that the rectifier (5) works on average with a drive level of, for example, 25°el., irrespective of the secondary voltage of the furnace transformer (2) and of the current desired value ($i_{des}$) set. For the sake of simplicity, values and signals assigned to them are denoted identically.

The frequencies to be suppressed by the bandpass filter (16) comprise frequencies in the range of 0.5 Hz–20 Hz.

By controlling at a constant drive level at the rectifier (5), a constant mean power factor is achieved in the feeding AC power supply network (1). The power of a working point is determined very simply by selecting a voltage stage of the furnace transformer (2) and prescribing the direct current.

If the aim is to use a voltage stage of the furnace transformer (2) to operate different working points or a variable power, the current desired value ($i_{des}$) is prescribed accordingly. It is true that lower powers are obtained in the case when the current is reduced but the drive level at the rectifier (5) still remains the same. However, the arc (10) becomes longer, as a consequence of smaller voltage losses in the AC power supply network (1). The furnace process, however, also requires shorter arcs (10) in the case of lower powers. In order to achieve this, it is possible in the case of a change in the current desired value ($i_{des}$) simultaneously to prescribe as well a corresponding new desired value for the drive level of the rectifier (5). Provision is made for this purpose of a function generator (22) which is described in more detail in EP-A1-0 498 239 and which prescribes the electrode controller reference variable signal ($\alpha_{des}$) as a function of the current desired value ($i_{des}$), as indicated by dashes in FIG. 1. It is thus also possible to enlarge the power range.

In order to compensate the variable reactive power of the arc furnace (8), provision is made of a 3-phase power factor compensator (31) which has per AC phase an AC power controller (28) in series with an inductor (29) and a switch (30) which is connected to the AC power supply network (1). The 3 AC power controllers (28) are interconnected in a delta connection, and are controlled in each case by an ignition pulse transformer (27).

Furthermore, via a current transformer (33) at which it is possible to tap a total current intensity ($i_{33}$) of the entire installation by means of auxiliaries and filter branches (4, 4') (which are not represented) for capacitive reactive power, the AC power supply network (1) is connected via a high-voltage transformer and 2 switches to a 3-phase high-voltage network (32) having an AC voltage of 220 kV. The total current intensity ($i_{33}$), a network voltage ($U_1$), detected by means of a voltage detector (34) of the AC power supply network (1) and a prescribable desired phase angle ($\phi_{des}$) are fed to the input of a phase-angle controller (35) which supplies on the output side a desired reactive power signal ($Q_{des8}$) for the arc furnace (8) to a negating input of a summer (25). A further negating input of the summer (25) is fed a reactive power actual value signal ($Q_8$) from the output of a function generator (24) which on the input side receives a current actual value signal ($i_{act}$), with $i_{act}=i_{act1}+i_{act2}$, from the summer (23), and the rectifier manipulated variable signal ($\alpha_{act}$) from the output of the current controller (14). A filter reactive power signal ($Q_F$) is fed, in a fashion corresponding to the constant capacitive reactive power of the filter branches (4, 4'), to a non-negating input of the summer (25). On the output side, the summer (25) supplies a total reactive power signal ($Q_G$), in a fashion corresponding to $Q_G=Q_F-Q_8-Q_{des8}$, to a function generator (26), which on the output side supplies a stabilization striking angle signal ($\alpha_{st}$) to the ignition pulse transformer (27).

Figure 2:
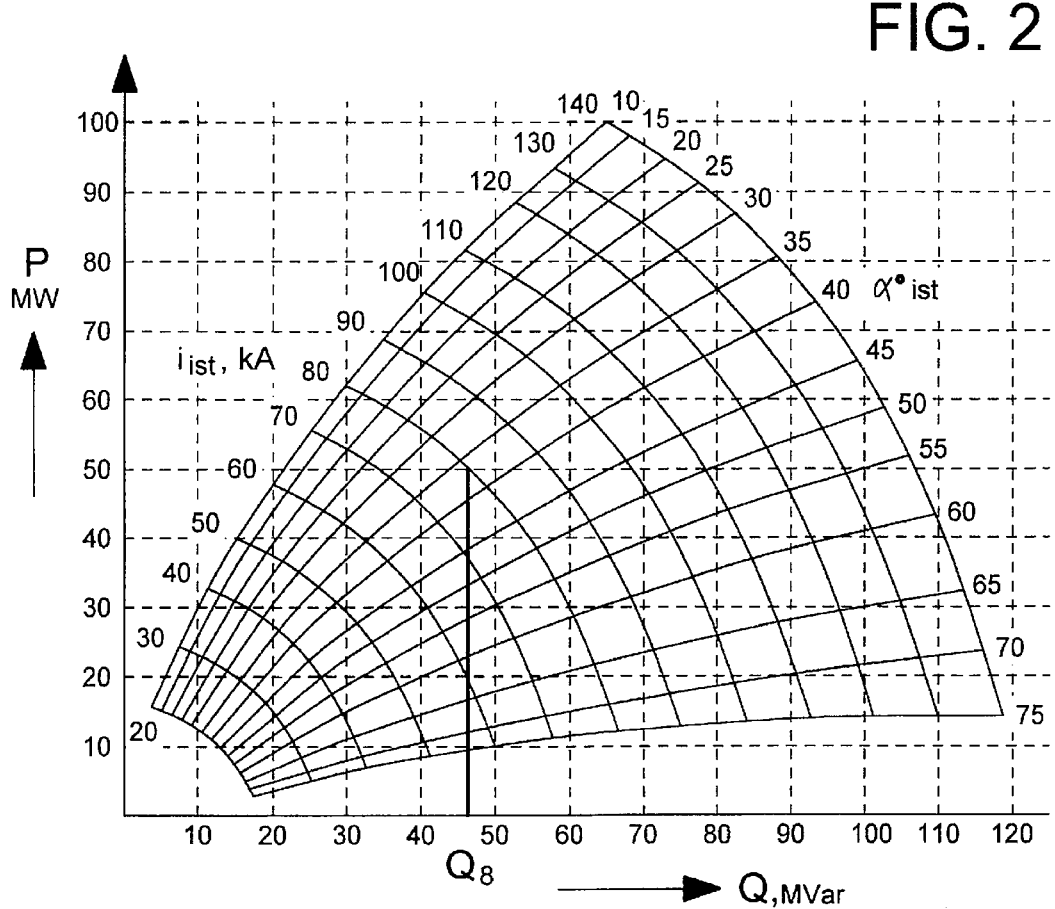
FIG. 2 shows a characteristic diagram for determining active power and reactive power of the arc furnace as a function of a striking angle actual value signal and a current actual value signal of the arc furnace in accordance with FIG. 1.

FIG. 2 shows a characteristics field of the function realized by means of the function generator (24):

$$Q_8 = k1 \cdot i_{act} \cdot [1-(\cos \alpha_{act}-k2 \cdot i_{act})^2]^{0.5},$$

k1 and k2 being installation-specific factors with $0.1 \leq k1 \leq 1$, preferably with $0.3 \leq k1 \leq 0.6$ and $0.7 \cdot 10^{-3} \leq k2 \leq 1.3 \cdot 10^{-3}$, preferably with $0.9 \cdot 10^{-3} \leq k2 \leq 1.1 \cdot 10^{-3}$. In this case, the rectifier manipulated variable signal ($\alpha_{act}$) is specified in degrees, the current actual value signal ($i_{act}$) in kA, the active power (P) in MW on the ordinate, and the reactive power (Q) in MVar on the abscissa. The result for an active power value (P) of 50 MW and a rectifier manipulated variable signal ($\alpha_{act}$) of 35° is, for example, a reactive power ($Q_8$) of 46 MVar.

Figure 3:
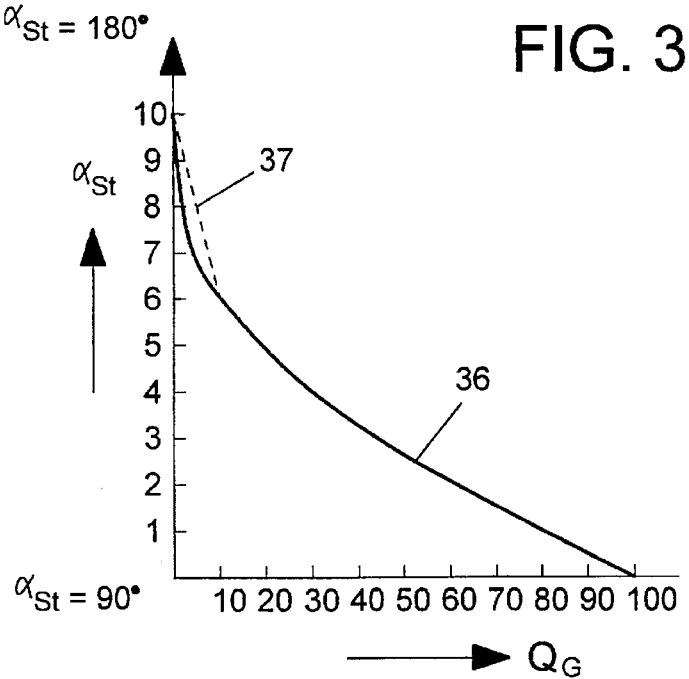
FIG. 3 shows a characteristic for determining the striking angle for the reactive power control loop as a function of the total reactive power of an installation having the arc furnace in accordance with FIG. 1.

FIG. 3 shows a characteristic (36) of the function realized by means of the function generator (26):

$$Q_G = \alpha_{st}°/90° - 2 - (\sin 2 \cdot \alpha_{st})/\pi,$$

($\alpha_{st}$) being plotted in degrees on the ordinate, and ($Q_G$) being plotted in % on the abscissa. In practice, the ideal curve (36) can be approximated by segments (37) indicated by dashes, and can be used to determine the value of the stabilization striking angle ($\alpha_{st}$).

The example represented relates to an installation having an active power (P) of 60 MW in conjunction with a direct current of 100 kA and an installed reactive or compensation power of 30 MVar. The installation is designed so as to yield a power factor cos $\phi=0.9$ given 100 kA and a drive level of the rectifiers (5, 5') with a rectifier manipulated variable signal ($\alpha_{act}$) of 35° at the feed AC power supply network (1).

LIST OF REFERENCE SYMBOLS

| | |
|---|---|
| 1 | AC power supply network |
| 2, 2' | Furnace transformers having a plurality of switching stages |
| 3, 3', 33 | Current transformers |
| 4, 4' | Filter branches for capacitive reactive power |
| 5, 5' | Rectifiers |
| 6, 6', 29 | Inductors, reactive elements |
| 7 | Cathode, electrode |
| 8 | Arc furnace |
| 10 | Arc |
| 11 | Melt, Molten bath |
| 12 | Anode, 2nd electrode |
| 13, 17, 23, 25 | Summers |
| 14 | Current controller |
| 15, 27 | Ignition pulse transformers |
| 16 | Bandpass filter |
| 16' | Damping element |
| 18 | Electrode controller |
| 19 | Valve amplifier |
| 20 | Valve |
| 21 | Electrode adjusting device |
| 22, 24, 26 | Function generators |
| 28 | AC power controller |
| 30 | Switch |
| 31 | Power factor compensator |
| 32 | High-voltage network |
| 34 | Voltage detector |
| 35 | Phase-angle controller |
| 36 | Characteristic |
| 37 | Segment |
| $\cos \phi$ | Power factor |
| $i_{33}$ | Total current intensity |
| $i_{act}$ | Current actual value signal |
| $i_{act1}, i_{act2}$ | Partial current actual value signals |
| $i_{des}$ | Current desired value signal |
| $Q_F$ | Filter reactive power signal from 4, 4' |
| $Q_G$ | Total reactive power signal |
| $Q_8$ | Reactive power actual value signal from 8 |
| $Q_{des8}$ | Desired reactive power signal from 8 |
| $U_1$ | Supply voltage of 1 |
| $\alpha_{act}$ | Rectifier manipulated variable signal, striking angle actual value |
| $\alpha_{des}$ | Electrode controller reference variable signal, striking angle desired value |
| $\alpha_{st}$ | Striking angle for 27, stabilization striking angle signal |
| $\phi$ des | Desired phase angle |

We claim:

1. Method for stabilizing a power supply against reactive load fluctuations of at least one electric device or installation of at least one variable reactive load, comprising the steps of:
   a) controlling current intensity by means of a control signal or manipulated variable signal ($\alpha_{act}$) to a prescribable current desired value or reactive power desired value,
   b) compensating reactive power fluctuations produced in the at least one variable reactive load as a function of the manipulated variable signal ($\alpha_{act}$) and as a function of a current actual value signal ($i_{act}$) or of the current desired value;
   c) compensating the reactive power fluctuations as a function of a total current intensity, which in addition to the current through the at least one variable reactive load, further comprises current through at least one power factor compensation device; and
   d) compensating the reactive power fluctuations as a function of a reactive power actual value signal $Q_8$ of the at least one variable reactive load, wherein the reactive power actual value signal $Q_8$ is formed in accordance with:

$$Q_8 = k1 \cdot i_{act} \cdot [\{1-(\cos \alpha_{act}-k2 \cdot i_{act})^2\}]^{0.5}$$

k1 and k2 being load-specific factors with $0.1 \leq k1 \leq 1$ and $0.7 \cdot 10^{-3} \leq k2 \leq 1.3 \cdot 10^{-3}$.

2. Method according to claim 1, further comprising the step of:
   a) compensating the reactive power fluctuations as a function of a desired reactive power signal, which is formed as a function of the total current intensity.

3. Method according to claim 2, wherein the desired reactive power signal is a control signal which
   a) is formed as a function of a supply voltage of an AC power supply network feeding the at least one variable reactive load,
   b) as a function, in addition, of the total current intensity and
   c) as a function of a prescribable desired phase angle.

4. Method according to claim 1, wherein $0.3 \leq k1 \leq 0.6$ and $0.9 \cdot 10^{-3} \leq k2 \leq 1.1 \cdot 10^{-3}$.

5. Method according to claim 1, wherein the reactive power fluctuations are further compensated as a function of a stabilization striking angle signal ($\alpha_{st}$), which is formed in accordance with:

$$Q_G = \alpha_{st}°/90°-2-(\sin 2 \cdot \alpha_{st})/\pi$$

$Q_G$ being a total reactive power signal for the reactive power of an entire variable reactive load in accordance with $Q_G = Q_F - Q_8 - Q_{des8}$, with $Q_F$=filter reactive power signal, $Q_8$=reactive power actual value signal and $Q_{des8}$=desired reactive power signal of the at least one variable reactive load.

6. Power factor compensation device comprising:
   a) at least one installation of variable reactive power,
   b) at least one filter branch with a capacitive reactive power,
   c) at least one power factor compensator which has at least one controller,
   d) a phase-angle controller which is operationally connected on an input side to at least one current transformer for detecting a total current intensity, and on an output side to the at least one controller of the power factor compensator,
   e) the phase-angle controller being operationally connected via a 1st function generator to the at least one controller of the power factor compensator, at which 1st function generator a total reactive power signal $Q_G$ is present on an input side, and a stabilization striking angle signal $\alpha_{st}$ is emitted on an output side in accordance with $$Q_G = \alpha_{st}°/90°-2-(\sin 2 \cdot a_{st})/\pi$$

f) the phase-angle controller being operationally connected via a summer to the 1st function generator, and
   g) the summer being operationally connected via a 2nd function generator to the at least one variable reactive load, which 2nd function generator emits a reactive power actual value signal $Q_8$ as a function of a current actual value signal $i_{act}$ and a rectifier manipulated variable signal $\alpha_{act}$ of the at least one variable reactive load in accordance with $$Q_8 = k1 \cdot i_{act} \cdot [1-(\cos \alpha_{act} - k2 \cdot i_{act})^2]^{0.5},$$

k1 and k2 being load-specific factors, with $0.1 \leq k1 \leq 1$ and $0.7 \cdot 10^{-3} \leq k2 \leq 1.3 \cdot 10^{-3}$.

7. Power factor compensation device according to claim 6, wherein the summer is fed a filter reactive power signal corresponding to capacitive reactive power of said at least one filter branch.

8. Power factor compensation device according to claim 6, wherein k1 and k2 are load-specific factors, with $0.3 \leq k1 \leq 0.6$ and $0.9 \cdot 10^{-3} \leq k2 \leq 1.1 \cdot 10^{-3}$.

9. Method for stabilizing a power supply against reactive load fluctuations of at least one electric device or installation of at least one variable reactive load, comprising the steps of:

a) controlling current intensity by means of a control signal or manipulated variable signal ($\alpha_{act}$) to a prescribable current desired value or reactive power desired value, b) compensating reactive power fluctuations produced in the at least one variable reactive load as a function of the manipulated variable signal ($\alpha_{act}$) and as a function of a current actual value signal ($i_{act}$) or of the current desired value; and c) compensating the reactive power fluctuations as a function of a total current intensity, which in addition to the current through the at least one variable reactive load, further comprises current through at least one power factor compensation device, wherein the reactive power fluctuations are further compensated as a function of a stabilization striking angle signal ($\alpha_{st}$), which is formed in accordance with:

$$Q_G = \alpha_{st}°/90° - 2 - (\sin 2 \cdot \alpha_{st})/\pi$$

$Q_G$ being a total reactive power signal for the reactive power of an entire variable reactive load in accordance with $Q_G = Q_F - Q_8 - Q_{des8}$, with $Q_F$=filter reactive power signal, $Q_8$=reactive power actual value signal and $Q_{des}$=desired reactive power signal of the at least one variable reactive load.

\* \* \* \* \*